United States Patent [19]

Shibata et al.

[11] Patent Number: 4,682,095
[45] Date of Patent: Jul. 21, 1987

[54] CIRCUIT ARRANGEMENT FOR CONTROLLING STARTING CURRENT OF A MOTOR

[75] Inventors: Nobuho Shibata; Isamu Yasunobu; Shigeo Neki; Kenichi Ohara; Takashi Dohi, all of Osaka, Japan

[73] Assignee: Matsushita Electric Industrial Co. Ltd., Japan

[21] Appl. No.: 876,913

[22] Filed: Jun. 20, 1986

[30] Foreign Application Priority Data

Jun. 20, 1985 [JP] Japan .............................. 60-134576

[51] Int. Cl.$^4$ .............................................. H02P 1/26
[52] U.S. Cl. ...................................... 318/778; 318/779; 318/798; 318/806
[58] Field of Search .............................. 318/801-803, 318/798, 778, 806-811, 779; 363/55-58, 130; 361/30, 31

[56] References Cited

U.S. PATENT DOCUMENTS

| | | | |
|---|---|---|---|
| 3,603,856 | 9/1971 | Zalar et al. | 318/798 |
| 3,947,748 | 3/1976 | Klein | 363/57 |
| 4,270,078 | 5/1981 | Walker et al. | 318/803 |
| 4,309,751 | 1/1982 | Okado | 363/138 |

Primary Examiner—David Smith, Jr.
Attorney, Agent, or Firm—Lowe, Price, LeBlanc Becker & Shur

[57] ABSTRACT

In a motor control apparatus arranged to drive a motor by rectifying a.c. voltage and smoothing a rectified voltage by a capacitor, a voltage across the capacitor is detected to see if the voltage is below a reference voltage or not by a first comparator (24), and if so, an output voltage (V) is produced. This output voltage (V) is used to change another reference voltage of another comparator (21) used for detecting if current to the motor (5) or a motor drive circuit (4) is greater than the reference. When the current is larger than the reference, the comparator (21) produces a low level output causing a control circuit (23) to control the drive circuit (4) to reduce the current to motor (5).

4 Claims, 7 Drawing Figures

FIG. 5A
PRIOR ART
FIG. 5B
PRIOR ART
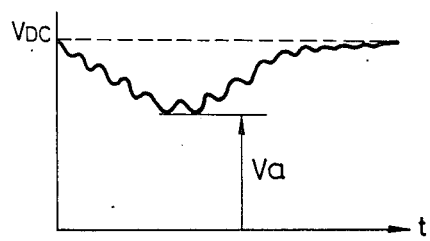
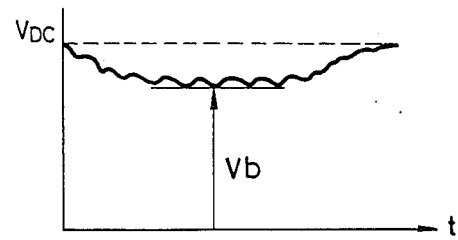
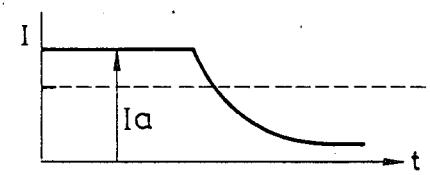
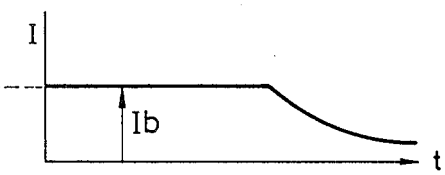
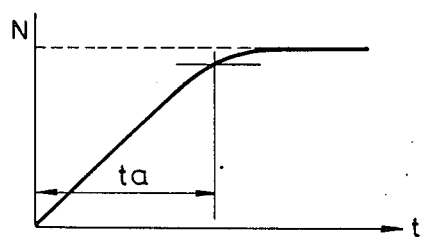
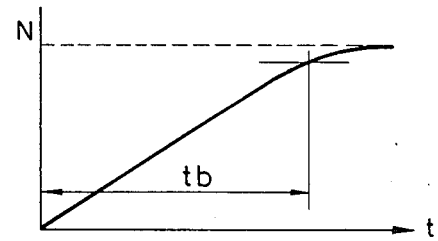

CIRCUIT ARRANGEMENT FOR CONTROLLING STARTING CURRENT OF A MOTOR

BACKGROUND OF THE INVENTION

1. Field of the Invention

This invention relates generally to motor control, and particularly to starting current control for a motor.

2. Description of Prior Art

When an a.c. servomotor or the like is driven by commercial frequency power source whose impedance is relatively high, flicker is apt to occur in lights connected to the commercial a.c. line. In order to reduce such flicker in conventional arrangements, a maximum limit of a starting current of a motor is decreased.

However, when the starting current is simply reduced, an accelerating period of time of a motor increases. Moreover, the reduction in starting current results in the reduction in instantaneous torque of the motor deteriorating starting characteristic. As a result, necessary torque which is required on start or inching of a short period of time is not fully generated.

SUMMARY OF THE INVENTION

The present invention has been developed in order to remove the above-described drawbacks inherent to the conventional motor control apparatus.

It is, therefore, an object of the present invention to provide a new and useful motor control apparatus for controlling starting current of an electrical motor so that flicker of lights connected to a.c. line is effectively prevented without deteriorating the acceleration and generating torque.

According to a feature of the present invention a current limiting value is lowered only when a voltage across a smoothing capacitor becomes lower than a predetermined value so as to prevent the voltage across the capacitor from lowering a given value. Since the current limiting value is lowered only on such occasion, torque reduction is effectively prevented compared to the conventional arrangement in which starting current is limited during entire starting period of time. As a result, it is possible to generate transient torque while flicker of lights is reduced.

More specifically, in a motor control apparatus arranged to drive a motor by rectifying a.c. voltage and smoothing a recitfied voltage by a capacitor, a voltage across the capacitor is detected to see if the voltage is below a reference voltage or not by a first comparator, and if so, an output voltage is produced. This output voltage is used to change another reference voltage of another comparator used for detecting if current to the motor or a motor drive circuit is greater than the reference. When the current is larger than the reference, the comparator produces a low level output causing a control circuit to control the drive circuit to reduce the current to motor.

In accordance with the present invention there is provided a circuit arrangement for controlling starting current of motor arranged to be driven by a power circuit including a rectifying means responsive to a.c. voltage source, a capacitor for smoothing rectified voltage from said rectifying means, and a drive circuit for driving said motor using a d.c. voltage across said capacitor, said circuit arrangement comprising: a first comparator responsive to said voltage across said capacitor and a reference voltage for producing an output voltage when said voltage across said capacitor is below said reference voltage; a current detecting circuit for detecting current to said drive circuit or current to said motor; a second comparator responsive to a voltage indicative of said current detected by said current detecting circuit and to a second reference voltage which is variable in response to said output voltage from said first comparator, said second comparator being arranged to produce an output signal when said voltage indicative of said current is higher than said second voltage; and a control circuit responsive to said output signal from said second comparator for controlling said drive circuit to control said current to said motor.

In accordance with the present invention there is also provided a A motor control apparatus comprising: a rectifying circuit connected to an a.c. power source; a smoothing capacitor for smoothing an output voltage from said rectifying circuit; a drive circuit using a voltage across said smoothing capacitor as its input for driving a motor; a current-limiting circuit for detecting and limiting either input current to said drive circuit or line current to said motor; and a voltage drop proof circuit for limiting said voltage across said capacitor so that it does not drop below a predetermined voltage by reducing a current-limiting value set in said current-limiting circuit.

BRIEF DESCRIPTION OF THE DRAWINGS

The object and features of the present invention will become more readily apparent from the following detailed description of the preferred embodiments taken in conjunction with the accompanying drawings in which:

FIGS. 5A and 5B are waveform charts used for describing the operation of the conventional arrangement of FIG. 4.

The same or corresponding elements and parts are designated at like reference numerals throughout the drawings.

DETAILED DESCRIPTION OF THE INVENTION

Prior to describing a preferred embodiment of the present invention, the above-mentioned conventional arrangement will be described for a better understanding of the present invention.

Figure 4:
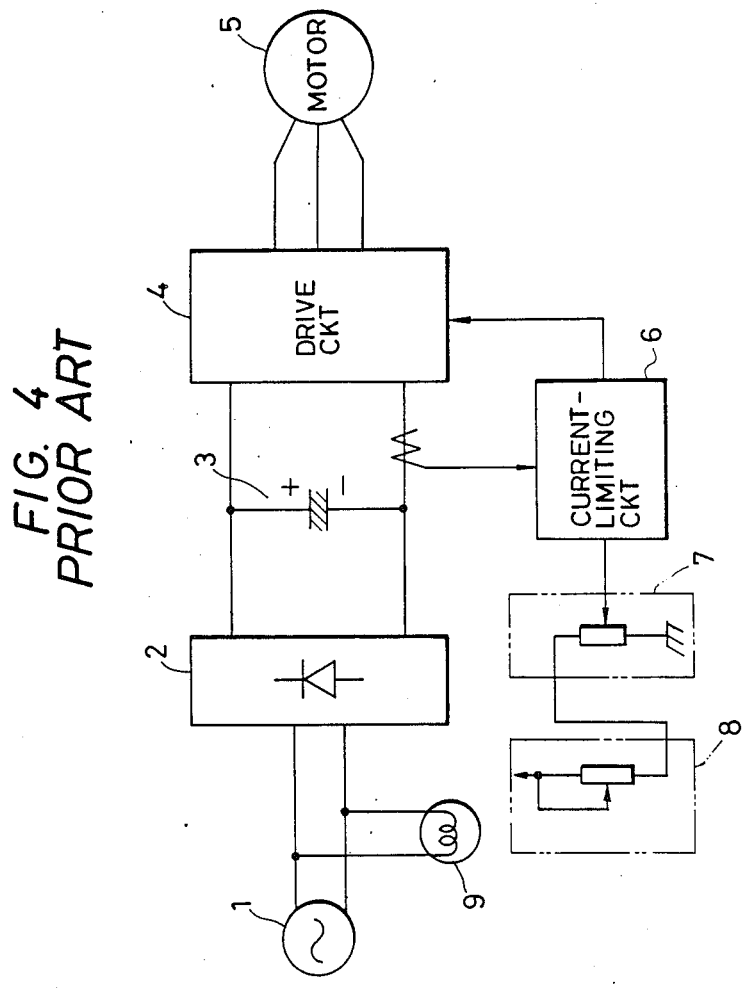
FIG. 4 is a block diagram showing a conventional motor control apparatus.

FIG. 4 is a block diagram showing the above-mentioned conventional circuit arrangement or motor control apparatus. In FIG. 4, the reference 1 is an a.c. power source; 2, a rectifying diode bridge; 3, a smoothing capacitor; 4, a motor drive circuit; 5, a servomotor; 6, a current-limiting circuit which detects input current fed to the drive circuit 4 and limits the current to a predetermined value. Although the current-limiting circuit 6 of the illustrated example is arranged to limit the input current to the drive circuit 4, line current to the motor 5 may be detected to control the same. The reference 7 is a limiting value setting circuit associated with the current-limiting circuit 6, and is used for setting the limiting value for the current-limiting circuit 6.

The reference 8 is an auxialiary current-limiting value setting circuit used for reducing the current-limiting value externally. The reference 9 is a lamp connected to a.c. line for illumination.

The conventional apparatus of FIG. 4 operates as follows:

In FIGS. 5A and 5B showing the operation of the apparatus of FIG. 4, the references $V_{DC}$, I and N respectively indicate a voltage across a capacitor 3, a current fed to the motor 5 and motor speed. When a setting value of the external current-limiting value setting circuit 8 is large, a current-limiting value on start of the motor 5 is Ia. When this starting current Ia flows, the voltage $V_{DC}$ across the capacitor 3 decreases to Va. The reference ta is a motor accelerating period of time.

Since the starting current Ia is of a relatively large value, input current fed from the a.c. power source 1 is also large, and when the impedance of the a.c. power source 1 is large, the lamp 9 connected to the a.c. power source 1 suffers from flicker. To prevent such flicker therefore, the current-limiting value is decreased by manipulating the external current-limiting value setting circuit 8.

FIG. 4B shows $V_{DC}$, I and N resulted after the current-limiting value has been set to Ib which is smaller than Ia. When the current-limiting value is set to Ib, then the voltage $V_{DC}$ across the capacitor decreases to Vb which is higher than Va. As a result, input current fed from the a.c. power source 1 is reduced to reduce flicker of the lamp 9.

In the conventional arrangement of FIG. 4, however, since the current-limiting value is continuously kept constant during starting operation unless the external current-limiting setting circuit 8 is manipulated, the aforementioned various problems relating to accelerating characteristic and generating torque occur.

Figure 1:
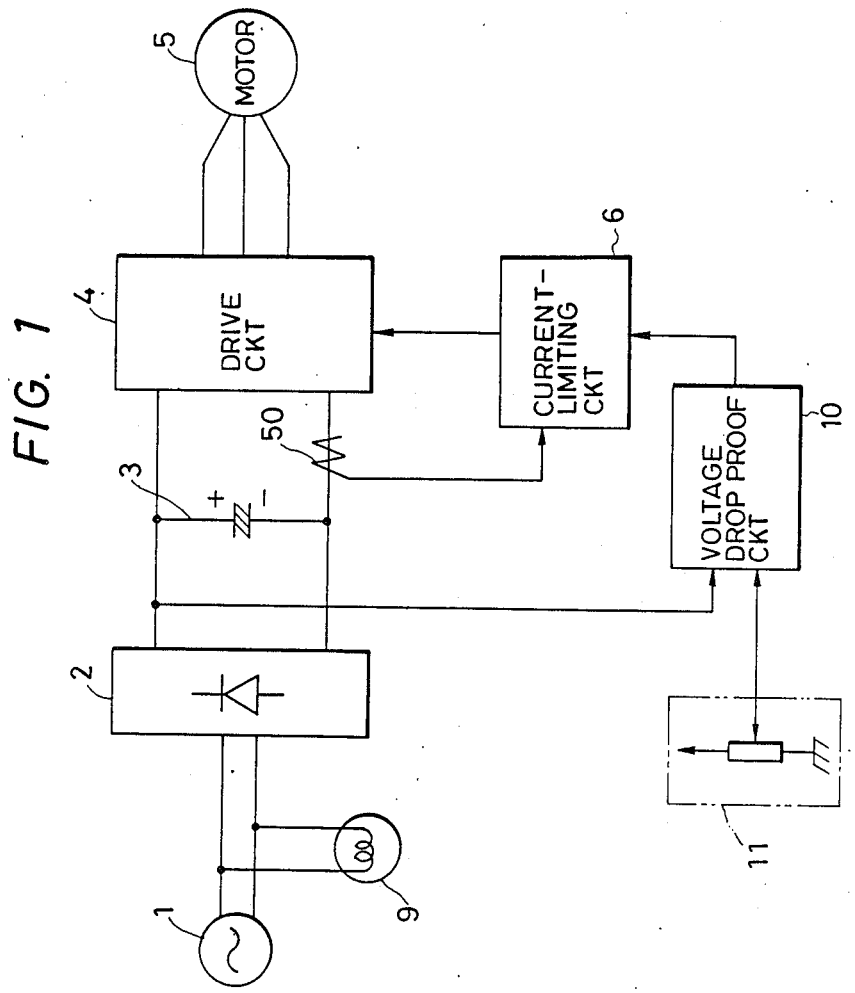
FIG. 1 is a schematic block diagram of an embodiment of the present invention.

Referring now to FIG. 1, a schematic block diagram of a circuit arrangement for controlling starting current according to the present invention is shown. An a.c. power source 1 is connected to input terminals of a rectifying diode bridge circuit 2 whose output terminals are connected to a motor drive circuit 4. A smoothing capacitor 3 is interposed between two output terminals of the bridge circuit 2. A servomotor 5 is connected to output terminals of the drive circuit 4. A lamp 9 is connected to the a.c. power source 1. The reference 6 indicates a current-limiting circuit 6 which limits input current fed to the motor drive circuit 4. However, the current-limiting circuit 6 may be arranged to limit line current to the servomotor 5 rather than the input current to the drive circuit 4. The reference 10 indicates a voltage drop proof circuit comprising a comparator arranged to compare a voltage across the smoothing capacitor $V_{DC}$ and a voltage set by a voltage-setting circuit 11. More specifically, the voltage drop proof circuit 10 is arranged to produce an output signal which causes the current-limiting circuit 6 to lower the current-limiting value when the voltage $V_{DC}$ drops below the setting voltage.

Figure 2:
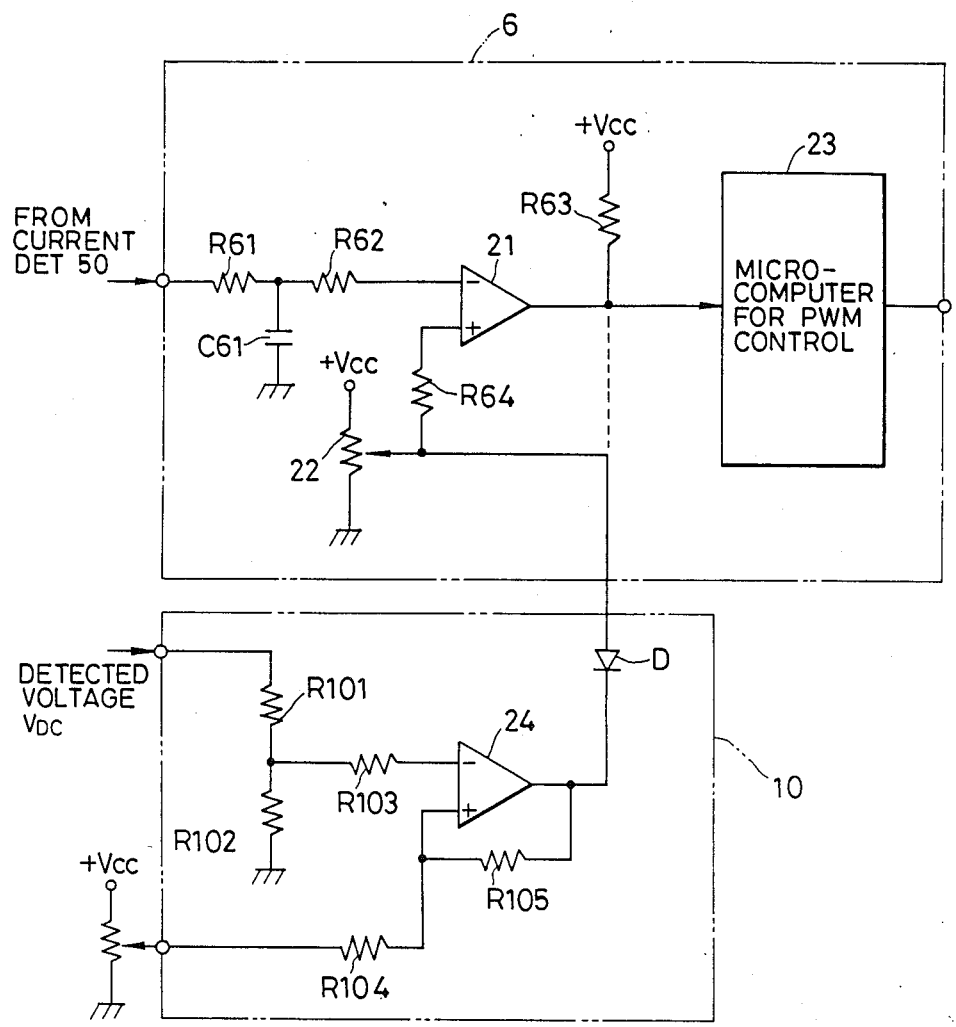
FIG. 2 is a circuit digram showing an important part in the block diagram of FIG. 1.

FIG. 2 shows a circuit diagram of the above-mentioned current-limiting circuit 6 and the voltage drop proof circuit 10. In the current-limiting circuit 6, the reference 21 is a comparator arranged to produce a low level output "L" when a detected current fed to the drive circuit 4 exceeds a current-limiting value. More specifically, a signal from a current detector 50 shown in FIG. 1 is fed via a series circuit of two resistors R61 and R62 to an inverting input terminal (−) of the comparator 21, while a noninverting input terminal (+) of the comparator 21 is connected via a resistor R64 to a movable contact of a variable resistor 22 interposed between d.c. voltage source +Vcc and ground. A junction between the two resistors R61 and R62 is grounded via a capacitor C61. An output terminal of the comparator 21 is connected via a pull up resistor R63 to the d.c. voltage source +Vcc.

The "L" signal developed at the out terminal of the comparator 21 is inputted to an interrupt terminal of a microcomputer 23 used for pulse width modulation (PWM) control. This microcomputer 23 controls a power transistor (not shown) included in the drive circuit 4 such that the power transistor in conductive state for energizing the motor 5 is turned off for a given period of time. As the power transistor is turned off, the current to the motor 5 decreases, and thus the comparator 21 produces a high level signal "H" which is fed to the microcomputer 23. As a result, the power transistor in the drive circuit 4 is turns on to increase the current to the motor 5. Therefore, when the current to the drive circuit 4 increases and this current exceeds the current-limiting value, then the above-mentioned operation is repeated. In this way, the peak value of the motor current is controlled such that motor current includes ripple.

In the voltage drop proof circuit 10, the detected voltage $V_{DC}$ across the capacitor 3 is fed to a voltage divider including two resistors R101 and R102 so as to divide the voltage $V_{DC}$. A divided voltage obtained across the resistor R102 is fed via a resistor R103 to an inverting input terminal (−) of a comparator 24 having a noninverting input terminal (+) responsive to a voltage set by the voltage setting circuit 11. More specifically, the voltage setting circuit 11, which may be a variable resistor interposed between a d.c. voltage source +Vcc and ground, is connected via a resistor R104, while the noninverting input (+) is connected via a feedback resistor R105 to an output terminal of the comparator 24.

Thus, the comparator 24 compares the voltages at its input terminals, and produces an "L" output when the detected voltage $V_{DC}$ drops below the setting voltage. This "L" signal is fed via a diode D to the current-limiting circuit 6 to cause the current-limiting value to decrease. Although the output from the comparator 24 is connected to the comparator 21 of the current-limiting circuit 6 in the illustrated embodiment, the output from the comparator 24 may be fed to the microcomputer 23 via an OR connection as indicated by dotted line.

Figure 3A:
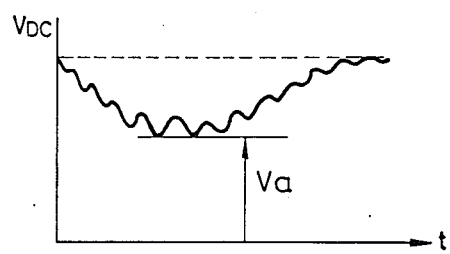
FIGS. 3A and 3B are waveform charts used for describing the operation of the embodiment of FIGS. 1 and 2.
Figure 3A:
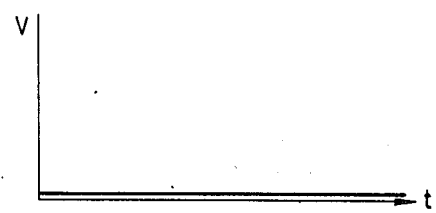
Figure 3A:
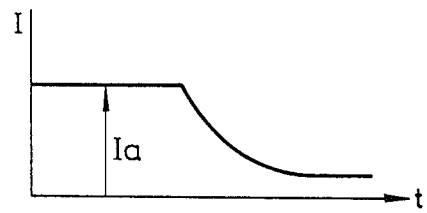
Figure 3A:
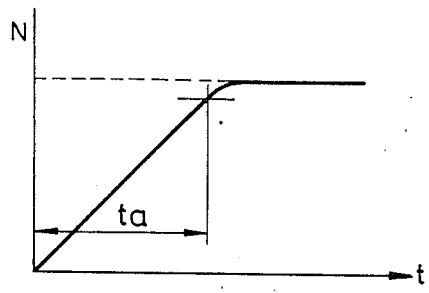
Figure 3B:
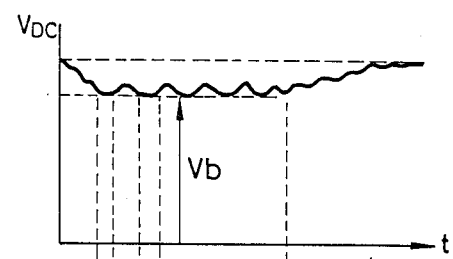
Figure 3B:
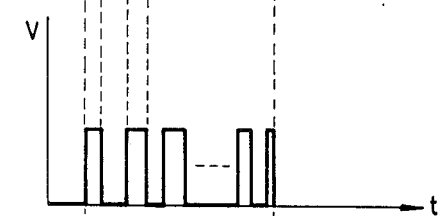
Figure 3B:
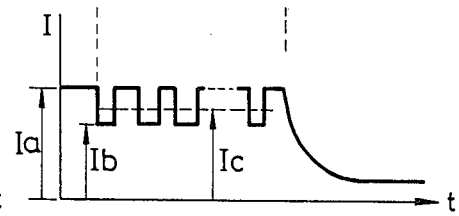
Figure 3B:
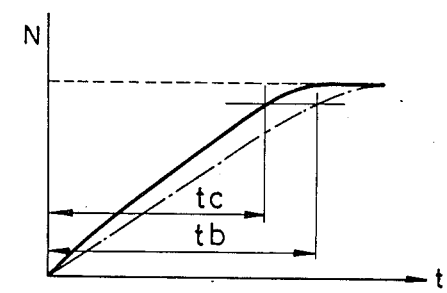

The embodiment shown in FIGS. 1 and 2 operates as follows:

In FIGS. 3A and 3B, the references $V_{DC}$, V, I and N respectively indicate the voltage across the smoothing capacitor 3, an output indicative of the operation of the voltage drop proof circuit 10, the current fed to the motor 5 and the motor speed. When the setting voltage set by the voltage setting circuit 11 is high, the voltage $V_{DC}$ across the capacitor 3 on starting drops to Va. At this time since the voltage drop proof circuit 10 does not operate, its output V does not appear. Under this condition, current-limiting value equals Ia and thus accelerating time of ta is resulted. When starting current is fed to the motor under this condition, if flicker of the lamp 9 occurs, the setting voltage of the voltage setting circuit 11 is raised. FIG. 3B shows the operation after the setting voltage is increased from Va to a higher value Vb. When the voltage $V_{DC}$ drops to Vb, the voltage drop proof circuit 10 produces its output V, and thus the current-limiting value is decreased from Ia to Ib. The current-limiting value Ib is, selected such that $V_{DC}$ equals Vb. More specifically in receipt of the output V from the voltage drop proof circuit 10, the comparator 21 produces "L" output to decrease current fed to the motor 5 from Ia to Ib. As the current to the motor 5 is decreased to Ib, the voltage $V_{DC}$ exceeds Vb and thus the output V from the comparator 24 is interrupted. In this way, the output V is intermittently produced so that the current to the motor 5 is changed between Ia and Ib repeatedly. The current I to the motor 5 thus assumes an average value Ic which is larger than limited current Ib in the conventional arrangement. As a result, an accelerating time tc is much smaller than that tb in the conventional arrangement. The current-limiting value is set to Ia until the voltage $V_{DC}$ decreases.

In this way, transient torque is effectively generated from the very beginning of starting.

The voltage setting circuit 11 may be located so that voltage setting is readily made when desired. Accordingly, a user of the motor may adjust the voltage setting circuit 11 in accordance with the state of flicker of the lamp 9.

The above-described embodiments are just examples of the present invention, and therefore, it will be apparent for those skilled in the art that many modifications and variations may be made without departing from the scope of the present invention.

What is claimed is:

1. A circuit arrangement for controlling starting current of motor arranged to be driven by a power circuit including a rectifying means responsive to a.c. voltage source, a capacitor for smoothing rectified voltage from said rectifying means, and a drive circuit for driving said motor using a d.c. voltage across said capacitor, said circuit arrangement comprising:
   (a) a first comparator responsive to said voltage across said capacitor and a reference voltage for producing an output voltage when said voltage across said capacitor is below said reference voltage;
   (b) a current detecting circuit for detecting current to said drive circuit or current to said motor;
   (c) a second comparator responsive to a voltage indicative of said current detected by said current detecting circuit and to a second reference voltage which is variable in response to said output voltage from said first comparator, said second comparator being arranged to produce an output signal when said voltage indicative of said current is higher than said second voltage; and
   (d) a control circuit responsive to said output signal from said second comparator for controlling said drive circuit to control said current to said motor.

2. A circuit arrangement as claimed in claim 1, further comprising a manually variable voltage setting means for producing said first reference voltage.

3. A motor control apparatus comprising:
   (a) a rectifying circuit connected to an a.c. power source;
   (b) a smoothing capacitor for smoothing an output voltage from said rectifying circuit;
   (c) a drive circuit using a voltage across said smoothing capacitor as its input for driving a motor;
   (d) a current-limiting circuit for detecting and limiting either input current to said drive circuit or line current to said motor; and
   (e) a voltage drop proof circuit for limiting said voltage across said capacitor so that it does not drop below a predetermined voltage by reducing a current-limiting value set in said current-limiting circuit.

4. A motor control apparatus as claimed in claim 3, wherein said voltage drop proof circuit comprises a comparator responsive to said voltage across said capacitor and a reference voltage.

* * * * *